(12) United States Patent
Sano

(10) Patent No.: US 7,145,130 B2
(45) Date of Patent: Dec. 5, 2006

(54) ROTATION DETECTING DEVICE AND AUTOMOBILE WITH THE SAME

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 187 days.

(21) Appl. No.: 10/900,918

(22) Filed: Jul. 28, 2004

(65) Prior Publication Data
US 2005/0022617 A1 Feb. 3, 2005

(30) Foreign Application Priority Data
Jul. 31, 2003 (JP) ............................. 2003-204666

(51) Int. Cl.
*G01D 5/34* (2006.01)
(52) U.S. Cl. ............................. 250/231.15; 250/231.13
(58) Field of Classification Search ................................
250/231.13–231.15, 231.17
See application file for complete search history.

(56) References Cited

U.S. PATENT DOCUMENTS

| | | | |
|---|---|---|---|
| 5,470,283 A | * | 11/1995 | Seidou ........................ 475/162 |
| 6,240,652 B1 | * | 6/2001 | Bobel et al. ................... 33/707 |
| 6,291,815 B1 | * | 9/2001 | Sugiyama et al. ..... 250/231.13 |

FOREIGN PATENT DOCUMENTS

| | | | |
|---|---|---|---|
| JP | 05312593 A | * | 11/1993 |
| JP | 10-227631 | | 8/1998 |

* cited by examiner

*Primary Examiner*—Georgia Epps
*Assistant Examiner*—Brian Livedalen
(74) *Attorney, Agent, or Firm*—Brinks Hofer Gilson & Lione

(57) ABSTRACT

The present invention provides a rotation detecting device having a small size, low manufacturing costs, and excellent quietness, and an automobile equipped with the rotation detecting device. The rotation detecting device comprises a non-rotating internal gear 2b concentrically arranged with the rotation center of a rotary body (a steering shaft), a planetary gear 4 that meshes with the internal gear 2b and that rotates and revolves on the inner circumference of the internal gear 2b with the rotation of the rotary body, a rotation transmitting member 6 that is concentrically arranged with the rotation center of the rotary body and that rotates on its own axis by the rotation of the planetary gear 4, a scale plate 7 provided in the rotation transmitting member 6, and a rotation angle detecting unit 11 arranged to face the scale plate 7 for detecting the rotation angle of one or more full rotations of the rotary body.

7 Claims, 5 Drawing Sheets

ROTATION DETECTING DEVICE AND AUTOMOBILE WITH THE SAME

BACKGROUND OF THE INVENTION

1. Field of the Invention

The present invention relates to a rotation detecting device and an automobile with the same, and more particularly, to a rotation detecting device suitable for detecting a rotation angle of one or more rotations of a rotary body and to an automobile comprising the rotation detecting device as a steering angle sensor of a steering wheel.

2. Description of the Related Art

Conventionally, a technique is known in which a rotation detecting device is provided between a steering shaft and a body of an automobile, and the control of a damping force of a suspension, the control of a shift position of an automatic transmission, and the steering control of rear wheels in a four-wheel steering vehicle are performed on the basis of the steering angle, steering speed, and steering direction of a steering wheel detected by the rotation detecting device.

The steering wheel (the steering shaft) is configured to rotate one or more in the right and left directions from its neutral position. Therefore, in order to detect the steering angle of the steering wheel, a rotation detecting device is used which is constructed by a combination of an absolute type encoder that detects a rotation angle of one or more full rotations and an incremental type recorder or an absolute type encoder that detects a rotation angle of less than one full rotation.

Conventionally, these kinds of rotation detecting devices include, for example, the following devices:

(1) a rotation detecting device comprising: a rotor member that rotates together with a code disc constituting a part of an incremental type encoder; a stator member that rotatably supports the rotor member; a relay gear journalled to the stator member; a rotating member that constitutes a part of an absolute type encoder that is arranged concentrically with the rotation center of the rotor member; and rotation angle detecting elements for detecting a rotation angle of the rotating member, wherein the relay gear is caused to intermittently mesh with engaging protrusions provided on the circumferential surface of the rotor member, and is caused to always mesh with a driven gear provided in the rotating member, the rotating member is rotated only in the period when the relay gear meshes with the engaging protrusions during the rotation of the rotor member, and the detecting elements detect a change in the rotation angle of the rotating member (for example, see Patent Document 1), (2) a rotation detecting device having an absolute type encoder and an incremental type encoder, wherein the absolute type encoder comprises a substrate having a resistance pattern, a decelerating rotary body having a brush to be brought into sliding contact with the resistance pattern, and a gear mechanism obtained by a combination of a plurality of gears that transmit the rotation of the steering wheel to the decelerating rotary body, and (3) a rotation detecting device in which an absolute type encoder converts rotational motion of a steering wheel into linear motion of a driven body, and the rotation angle of the steering wheel is detected in accordance with the magnitude of linear motion of the driven body.

[Patent Document 1]

Japanese Unexamined Patent Application Publication No. 10-227631 (see FIGS. 5 to 8)

The above-mentioned conventional rotation detecting devices have no problem in detecting a rotation angle of the rotary body.

However, in the rotation detecting device, as described in Patent Document 1, of the above-mentioned conventional rotation detecting devices, the relay gear is caused to intermittently mesh with the engaging projections provided on the circumferential surface of the rotor member. As a result, there are problems in that impact noise is easily generated whenever the relay gear meshes with the engaging projections, and the noise level becomes worse.

Further, in the rotation detecting device as described in Patent Document 1, a multi-stage gear mechanism obtained by a combination of three or more gears is required to increase the gear reduction ratio of the gear mechanism. Therefore, hysteresis is generated due to backlash of gears and the like and has an effect on the accuracy of detection, and a large space is needed for mounting the gear mechanism. As a result, there is a disadvantage in that the rotation detecting device is larger.

Moreover, in the rotation detecting device that converts the rotational motion of the steering wheel into the linear motion of the driven body, a motion conversion mechanism, such as a lead screw mechanism of gears, should be arranged in a circumferential direction of the steering wheel. Therefore, the number of parts is increased, thereby raising the manufacturing costs of the rotation detecting device, and a large space is needed for mounting a motion conversion mechanism. As a result, there is a disadvantage in that the rotation detecting device is large.

SUMMARY OF THE INVENTION

Accordingly, the present invention is designed to solve the above problems of the prior art, and it is an object of the present invention to provide a rotation detecting device having a small size, low manufacturing costs, and excellent quietness and an automobile equipped with the rotation detecting device.

In order to solve the problems, the present invention provides a rotation detecting device comprising: a non-rotating internal gear concentrically arranged with the rotation center of a rotary body; a planetary gear that meshes with the internal gear and that rotates and revolves on the inner circumference of the internal gear as the rotary body rotates; a rotation transmitting member that is concentrically arranged with the rotation center of the rotary body and that rotates on its own axis by the rotation of the planetary gear; an output medium provided in the rotation transmitting member; and a rotation angle detecting unit arranged to face the output medium for detecting a rotation angle of one or more full rotations of the rotary body.

As described above, when the speed reducing mechanism of the rotation transmitting member is constituted by a combination of the internal gear and the planetary gear, the planetary gear always meshes with the internal gear. Therefore, the quietness of the rotation detecting device can be improved without generating impact noise caused by a rotational operation of a rotary body. Further, since the speed reducing mechanism constituted by a combination of the internal gear and the planetary gear can obtain a large gear reduction ratio with only one stage, the number of parts can be reduced. Therefore, it is possible to provide a rotation detecting device having a small size and low manufacturing costs.

Further, according to the rotation detecting device of the present invention having the above structure, the output medium is any one of an optical medium, a magnetic storage medium, and a resistor, and the rotation angle detecting unit is composed of any one of a light emitting/receiving element, a magnetic detecting element, and a collecting brush, depending on the type of the output medium.

As described above, the combination of the output medium and the rotation angle detecting unit can be a combination of an optical medium and a light emitting/receiving element, a combination of a magnetic storage medium and a magnetic detecting element, or a combination of a resistor and a collecting brush. All of them are conventionally known as a combination of an output medium and a rotation angle detecting unit that constitutes an absolute type encoder. By employing such a structure, the rotation angle of a rotary body can be detected with the same degree of accuracy as that of a conventional rotation detecting device.

Further, according to the rotation detecting device of the present invention having the above structure, the output medium is formed in a spiral shape whose center is the rotation center of the rotary body or in an arcuate shape whose center is a point offset from the rotation center of the rotary body.

As described above, when the output medium is formed in the spiral shape whose center is the rotation center of the rotary body or in the arcuate shape whose center is a point offset from the rotation center of the rotary body, the rotation angle of the rotary body can be continuously detected. Therefore, it is possible to improve the accuracy of detection of a rotation angle of the rotation detecting device.

Furthermore, according to the rotation detecting device of the present invention having the above structure, the output medium is formed by a combination of a plurality of slits whose distances from the rotation center of the rotary body in its diametric direction are different from each other.

As described above, when the output medium is formed by a combination of a plurality of slits whose distances from the rotation center of the rotary body in its diametric direction are different from each other, the rotation angle of the rotary body can be intermittently detected at every predetermined rotation angle regulated by set positions of the slits. This also allows the rotation angle of one or more full rotations of a rotary body to be detected.

Moreover, according to the rotation detecting device of the present invention having the above structure, a plurality of sets of protrusions and loosely fitting portions of the protrusions that are loosely fitted to each other is formed on mutually opposed faces of the planetary gear and the rotation transmitting member, and the protrusions are loosely fitted into the loosely fitting portions. In addition, the rotation of the planetary gear is transmitted to the rotation transmitting member.

As described above, when the planetary gear and the rotation transmitting member are coupled to each other using a plurality of sets of protrusions and loosely fitting portions, which are respectively formed on mutually opposed faces of both members, the coupling of both members can be completed merely by loosely fitting the protrusions into the loosely fitting portions. Therefore, the planetary gear and the rotation transmitting member can be easily coupled to each other as compared to other power transmission mechanisms. As a result, the ease of assembly of the rotation detecting device can be improved, and the manufacturing costs of the rotation detecting device can be reduced.

Further, the rotation detecting device of the present invention having the above structure further comprises a code wheel concentrically mounted on the rotary body, and rotation angle detecting elements arranged to face the code patterns formed in the code wheel for detecting a rotation angle of the rotary body.

As described above, when the incremental encoder constituted by a combination of the code wheel and the rotation angle detecting elements is integrally assembled into the rotation detecting device having the absolute type encoder constituted by a combination of the rotation transmitting member and the rotation angle detecting unit, it is possible to obtain a rotation detecting device capable of detecting a rotation angle of one or more full rotations of a rotary body and a rotation angle of less than one rotation of a rotary body with high accuracy. Therefore, the present invention can be used to detect a rotation angle of a multi-rotation body, such as a steering wheel.

Furthermore, the present invention provides an automobile comprising: an internal gear concentrically arranged with a steering shaft and fixed to a vehicle body; a planetary gear that meshes with the internal gear and that rotates and revolves on the inner circumference of the internal gear as the steering shaft rotates; a rotation transmitting member that is concentrically arranged with the steering shaft and that rotates on its own axis by the rotation of the planetary gear; an output medium provided in the rotation transmitting member; and a rotation angle detecting unit arranged to face the output medium for detecting a rotation angle of one or more full rotations of the steering shaft.

As described above, when a speed reducing mechanism of the rotation transmitting member is constituted by a combination of the internal gear and the planetary gear, the planetary gear meshes with the internal gear. Therefore, the quietness inside an automobile can be improved without generating impact noise caused by a rotational operation of a steering shaft. In addition, the speed reducing mechanism constituted by a combination of the internal gear and the planetary gear can obtain a large gear reduction ratio with only one stage. Therefore, the number of parts can be reduced, and the manufacturing costs of an automobile can be reduced. Further, the design on a steering wheel can be simplified.

DESCRIPTION OF THE PREFERRED EMBODIMENT

Figure 1:
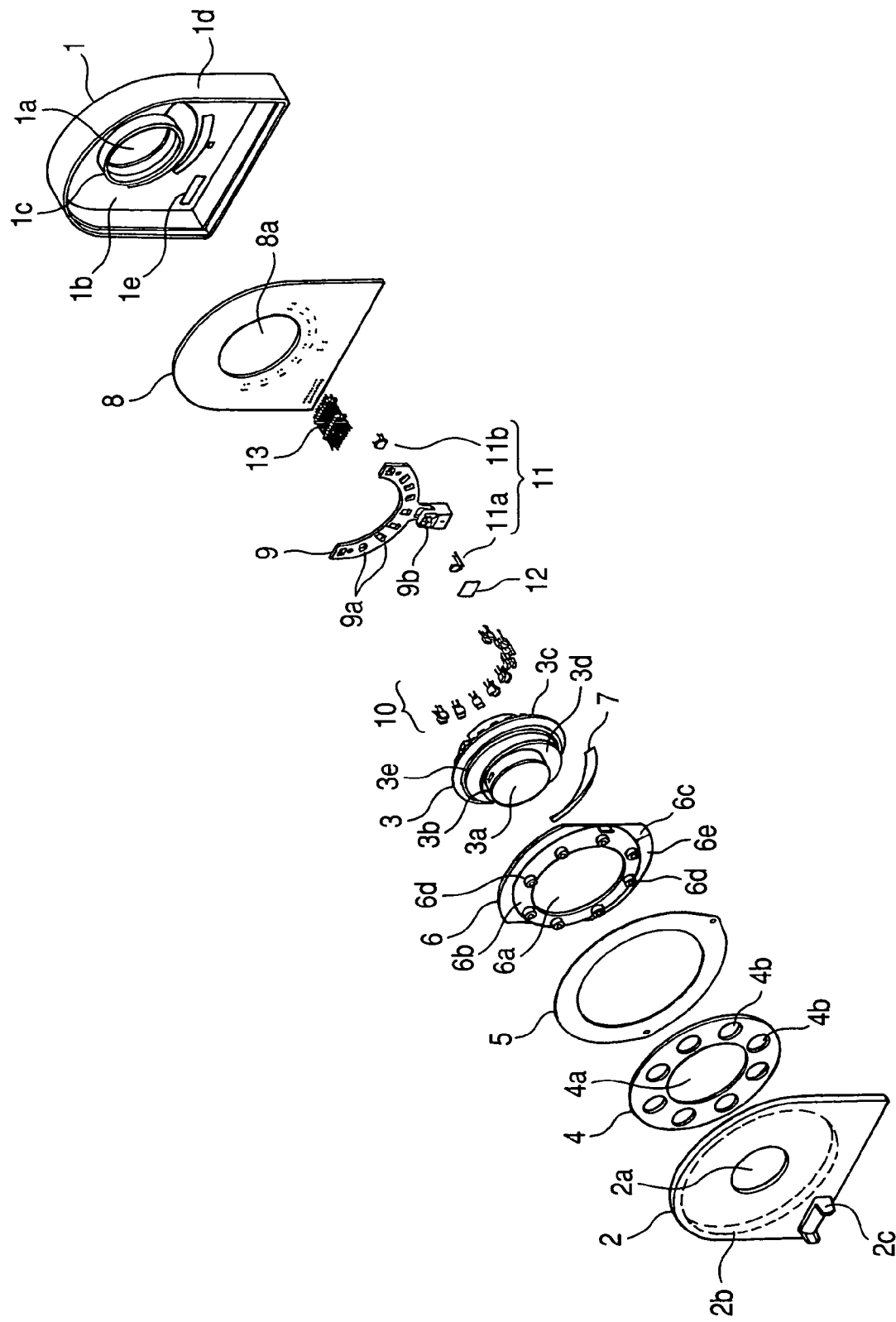
FIG. 1 is an exploded perspective view of a rotation detecting device according to an embodiment of the present invention.
Figure 2:
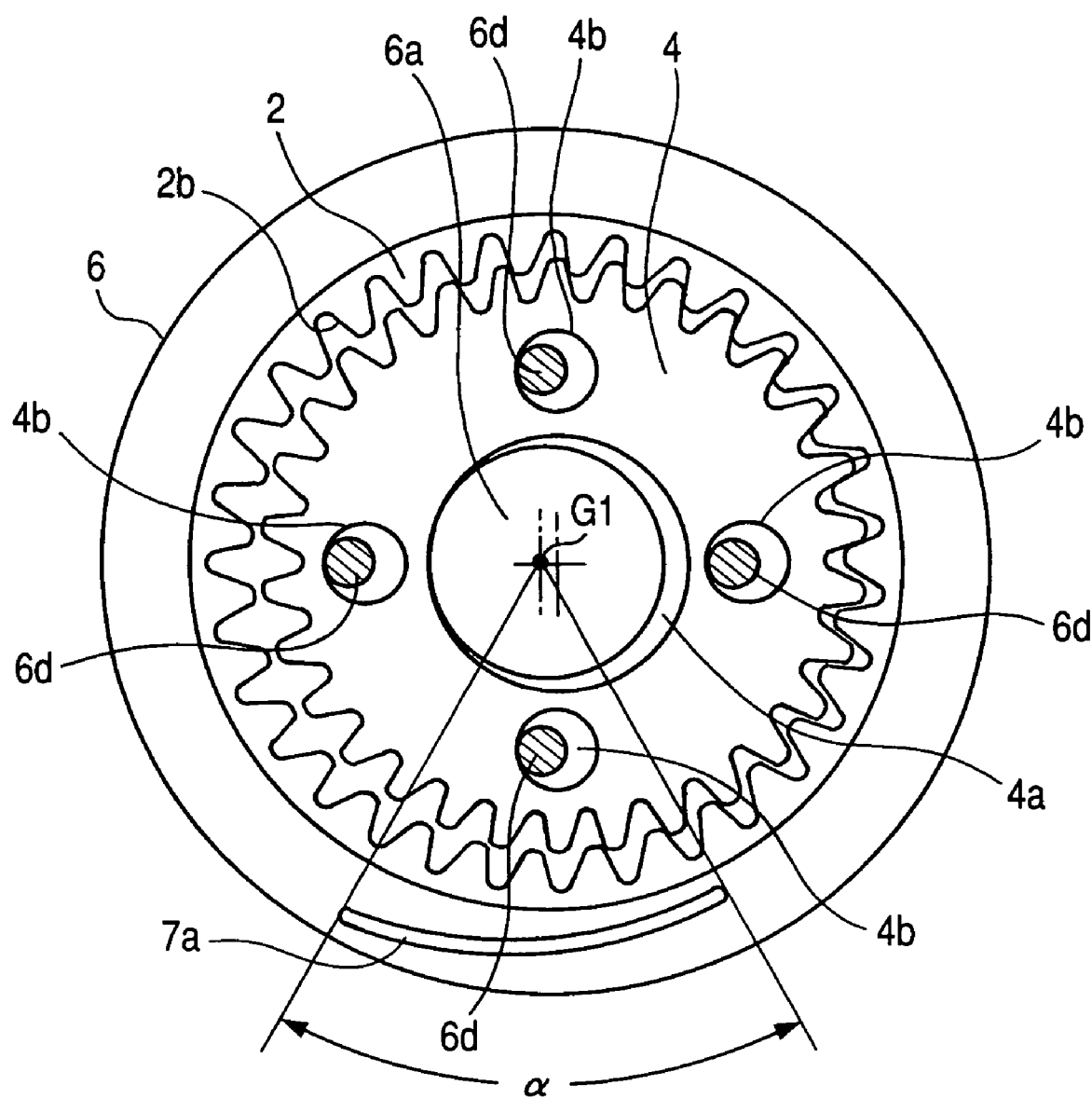
FIG. 2 is an inside view illustrating a coupling state of an internal gear, a planetary gear, and a rotation transmitting member, which are included in the rotation detecting device according to the embodiment.
Figure 3:
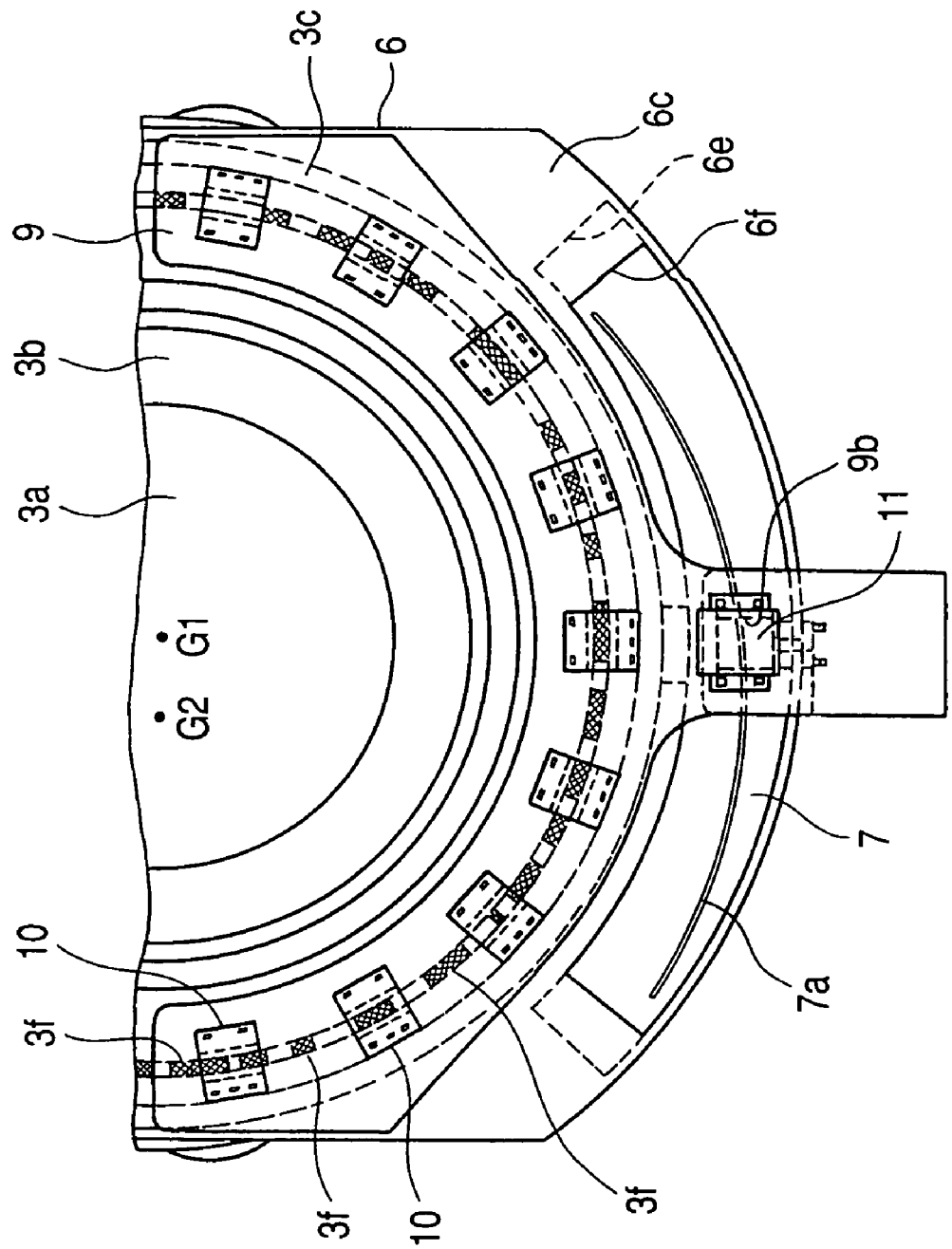
FIG. 3 is an explanatory view illustrating an arrangement of the rotation transmitting member, a code disc, a rotation angle detecting unit, and rotation angle detecting elements, which are included in the rotation detecting device according to the embodiment.
Figure 4:
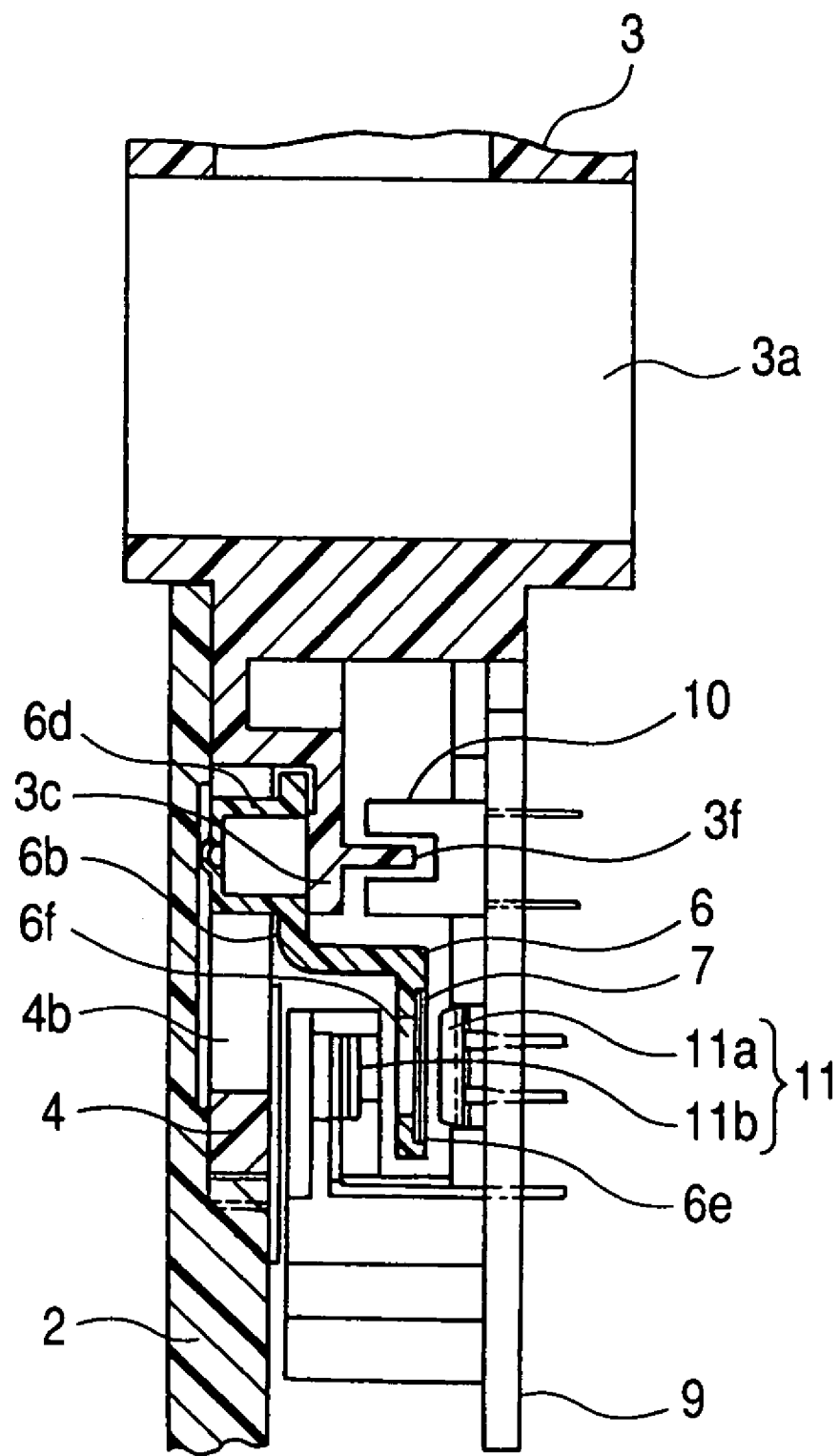
FIG. 4 is a cross-sectional view of essential parts of the rotation detecting device according to the embodiment.
Figure 5:
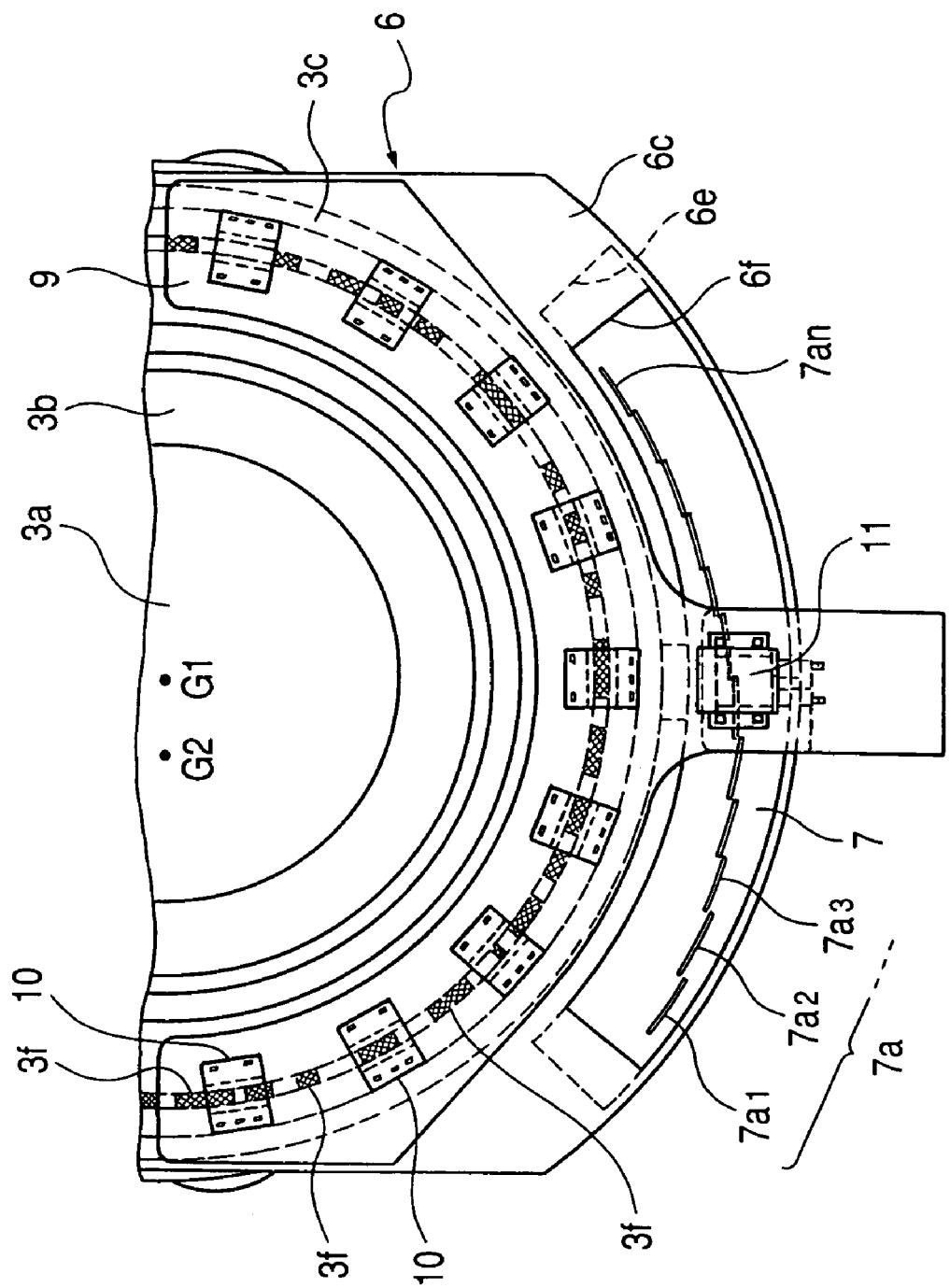
FIG. 5 is an explanatory view illustrating an arrangement of a rotation transmitting member, a code disc, a rotation angle detecting unit, and rotation angle detecting elements, which are included in a rotation detecting device according to another embodiment.

Hereinafter, embodiments of a rotation detecting device according to the present invention will be described with reference to FIGS. 1 to 5, wherein FIG. 1 is an exploded perspective view of a rotation detecting device according to an embodiment; FIG. 2 is an inside view illustrating a coupling state of an internal gear, a planetary gear, and a rotation transmitting member, which are included in the rotation detecting device according to the embodiment; FIG. 3 is an explanatory view illustrating an arrangement of the rotation transmitting member, a code disc, a rotation angle detecting unit, and rotation angle detecting elements, which are included in the rotation detecting device according to the embodiment; FIG. 4 is a cross-sectional view of essential parts of the rotation detecting device according to the embodiment; and FIG. 5 is an explanatory view illustrating an arrangement of a rotation transmitting member, a code disc, a rotation angle detecting unit, and rotation angle detecting elements, which are included in a rotation detecting device according to another embodiment.

As shown in FIG. 1, a rotation detecting device according to the present embodiment mainly comprises a case 1, a cover 2 affixed to an opening of the case 1, a code wheel 3 rotatably contained in the space constructed by combining the case 1 and the cover 2, a planetary gear 4 mounted on the code wheel 3, a holder 5 for holding the planetary gear 4 on the internal surface of the cover 2, a rotation transmitting member 6 that engages with the planetary gear 4 and is rotationally driven on its own axis by the rotation of the planetary gear 4, a scale plate 7 as an output medium mounted on the rotation transmitting member 6, a circuit board 8 set on the internal surface of the case 1, a detecting element receiver 9 mounted on the circuit board 8, a plurality (nine in this embodiment) of photo-interrupters (rotation angle detecting elements) 10 which is received in a predetermined arrangement in the detecting element receiver 9 and whose terminal portions are electrically connected to terminal portions formed on the circuit board 8, a rotation angle detecting unit 11 formed by the combination of a light-emitting diode 11a and a matched light-receiving element 11b, a stopper 12 adhered to the opening of the detecting element receiver 9 for preventing the light-emitting diode 11a from falling off from the detecting element receiver 9, and a connector 13, one end of which is connected to the circuit board 8 and the other end of which protrudes to the outside from the case 1.

The case 1 is composed of a bottom plate 1b having a central opening 1a, an annular inner wall 1c erected from the inner circumferential edge of the bottom plate 1b, and a cuplike outer wall 1d erected from the outer circumferential edge of the bottom plate 1b, and a connector insertion hole 1e is formed in the bottom plate 1b.

The cover 2 is formed in the shape of a plate having a central opening 2a. On the internal surface (the surface facing the case 1) of the cover 2, an internal gear 2b meshing with the planetary gear 4 is concentrically formed with the central opening 2a. Further, a joint 2c projects from the external surface of the cover 2 to be fixed to, for example, a body of an automobile.

These case 1 and cover 2 constitute a stator portion of a rotary encoder and are fixed to, for example, a body of an automobile via the joint 2c.

The code wheel 3 is composed of a rotor 3b having a central opening 3a and a code disc 3c anchored to the rotor 3b, and the rotation center of the rotor 3b (the axis of the central opening 3a) and the rotation center of the code disc 3c coincide with the rotation center of a rotary body, such as a steering shaft. As shown in FIG. 1, an eccentric shaft 3d for setting the planetary gear 4 and a mounting shaft 3e concentric with the rotation center of the rotor 3b for setting the rotation transmitting member 6 are formed in the rotor 3b. Further, as shown in FIGS. 3 and 4, a required number of light-shielding protrusions 3f for signal detection projects in a predetermined arrangement from an outer circumferential portion of the code disc 3c. The code wheel 3 is anchored to a rotary body, such as a steering shaft, which is passed through the central opening 3a, and rotates in conjunction with the rotary body.

The planetary gear 4 is formed in the shape of a ring having a central opening 4a and loosely fitting portions (through holes) 4b into which engaging projections 6d of the rotation transmitting member 6 are loosely fitted. The number of teeth of the planetary gear 4 is determined by considering the number of teeth of the internal gear 2b and the gear reduction ratio of the rotation transmitting member 6 with respect to the code wheel 3. For example, assuming that the number of teeth of the internal gear 2b is thirty-one and the number of teeth of the planetary gear 4 is thirty, the gear reduction ratio of the rotation transmitting member 6 with respect to the code wheel 3 can be 1/30. The planetary gear 4 is mounted on the eccentric shaft 3d formed in the rotor 3b of the code wheel 3 and meshes with the internal gear 2b.

The holder 5 prevents the planetary gear 4 from falling off from the case 2. The holder 5 is formed in the shape of a ring having an inside diameter that is smaller than the external feature of the planetary gear 4 and where the loosely fitting portions 4b of the planetary gear 4 is not covered, and is anchored to the case 2.

The rotation transmitting member 6 is composed of a protrusion setting portion 6b having a central opening 6a and a scale plate setting portion 6c protruding outward from the outer circumference of the protrusion setting portion 6b. As shown in FIGS. 1 and 4, engaging projections 6d project from the protrusion setting portion 6b so that they are loosely fitted into the loosely fitting portions 4b formed in the planetary gear 4. Further, as shown in FIGS. 3 and 4, a recess 6e is formed in the scale plate setting portion 6c to bury the scale plate 7. A through hole 6f having an area smaller than that of the recess 6e is formed in the recess 6e. The rotation transmitting member 6 is rotatably mounted on the mounting shaft 3e formed in the rotor 3b of the code wheel 3, and is integrally combined with the planetary gear 4 by loosely fitting the engaging projections 6d into the loosely fitting portions 4b formed in the planetary gear 4. As shown in FIG. 2, in an assembled state, the inner circumferential surfaces of the loosely fitting portions 4b are always kept in close contact with the outer circumferential surfaces of the engaging projections 6d, so that the rotation of the planetary gear 4 is transmitted to the rotation transmitting member 6 without slack.

The scale plate 7 is formed of an opaque, arcuate plate. As shown in FIG. 3, an arcuate slit 7a is formed to penetrate the scale plate from its obverse to its reverse. The slit 7a may be formed in a spiral shape whose center is a rotation center (the rotation center of a rotary body) G1 of the rotation transmitting member 6. Otherwise, the slit may be formed in an arcuate shape whose center is a point G2 offset from the rotation center G1 of the rotation transmitting member 6. Further, an angle α formed with respect to the center point of the slit 7a is set to such a range that the rotation angle detecting unit 11 can detect the slit 7a anywhere within the range of motion of the rotary body, in view of the range of motion of the rotary body and the gear reduction ratio of a speed reducing mechanism composed of the internal gear 2b formed in the cover 2 and the planetary gear 4. The range of motion of a rotary body is, for example, ±900 degrees with the neutral position used as the center. When the gear reduction ratio of the speed reducing mechanism is 1/30, the angle α formed with respect to the center point of the slit 7a is set to the range of ±30 degrees or larger with the neutral position used as the center.

The circuit board 8 is formed in the shape that can be contained in the case 1. A central opening 8a having a diameter larger than the external feature of the inner wall 1c is formed in a portion of the circuit board 8 corresponding to the annular inner wall 1c formed in the case 1. A predetermined circuit pattern including connections of the photo-interrupters 10, the rotation angle detecting unit, 11 and the connector 13 are formed in the surface of the circuit board 8.

The detecting element receiver 9 arranges the photo-interrupters 10 and the rotation angle detecting unit 11 in a predetermined arrangement. The detecting element receiver 9 has small sections 9a for individually receiving the respective photo-interrupters 10 and small sections 9b for individually receiving the light-emitting diode 11a and the light-receiving element 11b constituting the rotation angle detecting unit 11 and is anchored on the circuit board 8.

Each photo-interrupter (the rotation angle detecting element) 10, as shown in FIG. 4, is obtained by arranging a light-emitting element and a light-receiving element so as to face each other. A gap between the light-emitting element and the light-receiving element is sized so that the light-shielding protrusion 3f projecting from the outer circumferential portion of the code disc 3c can be inserted through the gap. As is clear from FIGS. 3 and 4, the respective photo-interrupters 10 are arranged along the orbit of the light-shielding protrusions 3f.

The rotation angle detecting unit 11 comprises a combination of a light-emitting diode 11a and a matched light-receiving element 11b, which are arranged to face each other in the small section 9b formed in the detecting element receiver 9. As shown in FIG. 4, a gap between the light-emitting diode 11a and the light-receiving element 11b is sized so that the rotation transmitting member 6 and the scale plate 7 can be inserted through the gap. Further, the rotation angle detecting unit 11, as shown in FIG. 4, is set along the path of movement of the slit 7a formed in the scale plate 7.

The stopper 12 prevents the light-emitting diode 11a from falling off from the detecting element receiver 9, and is adhered to an opening of the small section 9b formed in the detecting element receiver 9.

The connector 13 electrically connects the rotation detecting device according to the present embodiment to a control device (not shown). One end of the connector is connected to the circuit board 8, and the tip of the connector protrudes outward through the connector insertion hole 1e formed in the case 1.

Hereinafter, the operation of the rotation detecting device constructed as above will be explained.

When a rotary body, such as a steering shaft, that passes through the respective central openings 1a, 2a, 3a, 4a, and 6a and is anchored to the rotor 3b of the code wheel 3, rotates, the code disc 3c rotates about the rotation center of the rotary body, and the light-receiving elements of the photo-interrupters 10 vary in their light receiving state in accordance with the combinations of the light-shielding protrusions 3f that cross the photo-interrupters 10. The control device (not shown) calculates a rotation angle of less than one full rotation of a rotary body from a change in the light receiving state of the photo-interrupters 10.

Further, as the code disc 3c rotates, the planetary gear 4 revolves about the rotation center of the rotary body, and rotates by meshing with the internal gear 2b formed in the cover 2. Since this rotation is transmitted to the rotation transmitting member 6 coupled to the planetary gear 4, and the scale plate 7 rotates about the rotation center of the rotary body, the opening position of the slit 7a with respect to a set position of the rotation angle detecting unit 11 varies, resulting in a variation in the light receiving state of the light-receiving element 11b constituting the rotation angle detecting unit 11. The control device (not shown) calculates an absolute rotation angle of the rotary body from a change in the light receiving state of the light-receiving element 11b.

In the rotation detecting device according to the present embodiment, since the speed reducing mechanism of the rotation transmitting member 6 comprises a combination of the internal gear 2b and the planetary gear 4 that always mesh each other, the quietness of the rotation detecting device can be improved without generating impact noise caused by a rotational operation of the rotary body. Further, since the speed reducing mechanism comprising a combination of the internal gear 2b and the planetary gear 4 can obtain a large gear reduction ratio with only one stage, the number of parts can be reduced. Therefore, it is possible to provide a rotation detecting device having low manufacturing costs and a small size.

Further, since the rotation detecting device according to the present embodiment comprises the scale plate 7 having the slit 7a as an output medium, and an absolute type encoder is composed of the scale plate 7 and the optical rotation angle detecting unit 11 that detects a positional change of the slit 7a, the rotation angle of a rotary body can be detected with the same degree of accuracy as that of a conventional rotation detecting device.

In addition, in the above-mentioned embodiment, the scale plate 7 in which the slit 7a is formed is used as an output medium. However, the scope of the present invention is not limited thereto, and a plurality of light-shielding protrusions may project from the scale plate 7, similar to the code disc 3c. Further, instead of such an optical medium, a magnetic storage medium having a predetermined magnetic pattern formed thereon or a resistor having a predetermined resistor pattern formed thereon may be used as an output medium. Of course, when a magnetic storage medium is used as the output medium, a magnetic detecting element is provided as the rotation angle detecting unit 11. When a resistor is used as the output medium, a collecting brush is provided as the rotation angle detecting unit 11. In such a construction, the same effects as those of the rotation detecting device according to the embodiment can be obtained.

Furthermore, in the rotation detecting device according to the present embodiment, since the spiral slit 7a whose center is the rotation center G1 of the rotation transmitting member 6 or the arcuate slit 7a whose center is the point G2 offset from the rotation center G1 of the rotation transmitting member 6 is formed on the scale plate 7, which is an output medium, the rotation angle of a rotary body can be continuously detected, and thus the rotation detecting device can detect a rotation angle with high accuracy.

In addition, in the above-mentioned embodiment, the slit 7a is formed in a continuous spiral shape or in an arcuate shape. However, the scope of the present invention is not limited thereto, and as shown in FIG. 5, the slit may be constructed by a combination of a plurality of slits 7a1 to 7an whose distances from the rotation center G1 of a rotary body in its diametric direction are different from each other. According to this structure, since the rotation angle of a rotary body can be intermittently detected by detecting the respective slits 7a1 to 7an, the rotation angle of one or more full rotations of a rotary body can be detected.

Further, in the rotation detecting device according to the present embodiment, the loosely fitting portions 4b comprising through holes are formed in the planetary gear 4 and the engaging projections 6d that can be loosely fitted into the loosely fitting portions 4b are formed at positions of the rotation transmitting member 6 facing the loosely fitting portions, so that the rotation of the planetary gear 4 is transmitted to the rotation transmitting member 6 by loosely fitting the engaging projections 6d into the loosely fitting portions 4b. Therefore, the coupling of both members 4 and 6 can be completed only by loosely fitting the engaging projections 6d into the loosely fitting portions 4b, and the ease of assembly of the rotation detecting device can be improved compared to other power transmission mechanisms. Thus, it is possible to reduce the manufacturing costs of the rotation detecting device.

Furthermore, according to the above-mentioned embodiment, the loosely fitting portions 4b are formed in the planetary gear 4, and the engaging projections 6d are formed in the rotation transmitting member 6. However, the scope of the present invention is not limited thereto, and the engaging projections may be formed in the planetary gear 4, and the loosely fitting portions may be formed in the rotation transmitting member 6. In addition, the engaging projections and loosely fitting portions, which are loosely fitted to each other, may be alternately arranged in both the planetary gear 4 and the rotation transmitting member 6. Further, in the above-mentioned embodiment, through holes are formed in the planetary gear 4 as the loosely fitting portions 4b. However, the scope of the present invention is not limited thereto, and recesses into which the engaging projections 6d can be loosely fitted may be formed.

Moreover, in the rotation detecting device according to the present embodiment, an incremental encoder comprising a combination of the code wheel 3 and the photo-interrupters 10, which are rotation angle detecting elements, is integrally assembled into a rotation detecting device having an absolute type encoder comprising a combination of the rotation transmitting member 6 and the rotation angle detecting unit 11. Therefore, the rotation angle of one or more full rotations of a rotary body can be detected, and it is possible to achieve a rotation detecting device capable of detecting the rotation angle of less than one full revolution of a rotary body with high accuracy. Thus, it is possible to detect the rotation angle of a multi-rotation body, such as a steering wheel.

The rotation detecting devices according to the respective embodiments can be provided between a body and a steering shaft of an automobile to be used as a steering angle sensor of a steering wheel. In an automobile comprising the rotation detecting device according to any one of the respective embodiments as a steering angle sensor of a steering wheel, a speed reducing mechanism of the rotation transmitting member 6 is constructed by a combination of the internal gear 2b and the planetary gear 4, which always mesh with each other. Therefore, the quietness inside an automobile can be improved without generating impact noise caused by a rotational operation of a steering shaft. Further, the speed reducing mechanism constituted by a combination of the internal gear 2b and the planetary gear 4 can obtain a large gear reduction ratio with only one stage. Therefore, the number of parts can be reduced, and thus the manufacturing costs of an automobile can be reduced. In addition, the design on a steering wheel can be simplified.

As mentioned above, in the rotation detecting device according to the present invention, the speed reducing mechanism of the rotation transmitting member is constituted by a combination of the internal gear and the planetary gear, which always mesh with each other. Therefore, the quietness of the rotation detecting device can be improved without generating impact noise caused by a rotational operation of a rotary body. Further, since the speed reducing mechanism constituted by a combination of the internal gear and the planetary gear can obtain a large gear reduction ratio with only one stage, the number of parts can be reduced. Therefore, it is possible to provide a rotation detecting device having low manufacturing costs and a small size.

Further, an automobile of the present invention comprises a rotation detecting device in which a speed reducing mechanism of a rotation transmitting member is constituted by a combination of an internal gear and a planetary gear, which always mesh with each other. Therefore, the quietness inside an automobile can be improved without generating impact noise caused by a rotational operation of a steering shaft. In addition, the speed reducing mechanism constituted by a combination of the internal gear and the planetary gear can obtain a large gear reduction ratio with only one stage. Therefore, the number of parts can be reduced, and thus the manufacturing costs of an automobile can be reduced. In addition, the design on a steering wheel can be simplified.

What is claimed is:

1. A rotation detecting device comprising:
   a non-rotating internal gear concentrically arranged with a rotation center of a rotary body;
   a planetary gear that meshes with the internal gear and that rotates and revolves on an inner circumference of the internal gear as the rotary body rotates;
   a rotation transmitting member that is concentrically arranged with the rotation center of the rotary body and that rotates on its own axis by the rotation of the planetary gear;
   an output medium provided in the rotation transmitting member;
   a rotation angle detecting unit arranged to face the output medium for detecting a rotation angle of one or more full rotations of the rotary body;
   and a rotor having a code disc anchored to the rotor; the rotor having an eccentric shaft formed in the rotor; the rotation center of the rotor coinciding with a rotation center of the rotary body; the rotary body being anchored to a central opening of the rotor; and the eccentric shaft of the rotor is attached to a central opening of a planetary gear so that the planetary gear meshes with the non-rotating internal gear.

2. The rotation detecting device according to claim 1, wherein the output medium is any one of an optical medium, a magnetic storage medium, and a resistor, and the rotation angle detecting unit is composed of any one of a light emitting/receiving element, a magnetic detecting element, and a collecting brush, depending on the type of the output medium.

3. The rotation detecting device according to claim 1, wherein the output medium is formed in a spiral shape whose center is the rotation center of the rotary body or in an arcuate shape whose center is a point offset from the rotation center of the rotary body.

4. The rotation detecting device according to claim 1, wherein the output medium is formed by a combination of a plurality of slits whose distances from the rotation center of the rotary body in a diametric direction are different from each other.

5. The rotation detecting device according to claim 1, wherein a plurality of sets of protrusions and loosely fitting portions of the protrusions that are loosely fitted to each other is formed on mutually opposed faces of the planetary gear and the rotation transmitting member, wherein the protrusions are loosely fitted into the loosely fitting portions, and wherein the rotation of the planetary gear is transmitted to the rotation transmitting member.

6. The rotation detecting device according to claim 1, further comprising:

light-shielding protrusions that project from the code disc;

photo-interrupters arranged along the orbit of the light-shielding protrusions, and rotation angle detecting elements arranged to face code patterns formed in the code wheel for detecting a rotation angle of the rotary body.

7. An automobile comprising:

an internal gear concentrically arranged with a steering shaft and fixed to a vehicle body;

a planetary gear that meshes with the internal gear and that rotates and revolves on an inner circumference of the internal gear as the steering shaft rotates;

a rotation transmitting member that is concentrically arranged with the steering shaft and that rotates on its own axis by the rotation of the planetary gear;

an output medium provided in the rotation transmitting member;

a rotation angle detecting unit arranged to face the output medium for detecting a rotation angle of one or more full rotations of the steering shaft;

and a rotor having a code disc anchored to the rotor; the rotor having an eccentric shaft formed in the rotor; the rotation center of the rotor coinciding with a rotation center of the rotary body; the rotary body being anchored to a central opening of the rotor; and the eccentric shaft of the rotor attached to a central opening of a planetary gear so that the planetary gear meshes with the non-rotating internal gear.

* * * * *